United States Patent
Filev et al.

(10) Patent No.: US 9,352,650 B2
(45) Date of Patent: May 31, 2016

(54) RULE-BASED CRUISE CONTROL SYSTEM AND METHOD

(71) Applicant: Ford Global Technologies, LLC, Dearborn, MI (US)

(72) Inventors: Dimitar Petrov Filev, Novi, MI (US); John Ottavio Michelini, Sterling Heights, MI (US); Steven Joseph Szwabowski, Northville, MI (US); Anthony Mario D'Amato, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/567,227

(22) Filed: Dec. 11, 2014

(65) Prior Publication Data
US 2015/0165905 A1 Jun. 18, 2015

Related U.S. Application Data

(60) Provisional application No. 61/915,365, filed on Dec. 12, 2013, provisional application No. 61/987,241, filed on May 1, 2014.

(51) Int. Cl.
*B60K 31/00* (2006.01)
*B60W 10/06* (2006.01)
(Continued)

(52) U.S. Cl.
CPC .............. *B60K 31/00* (2013.01); *B60W 10/06* (2013.01); *B60W 10/10* (2013.01); *B60W 10/18* (2013.01);
(Continued)

(58) Field of Classification Search
CPC . B60K 31/00; B60K 2310/244; B60W 10/06; B60W 10/10; B60W 30/143; B60W 2720/10; B60W 2550/142; Y02T 10/48
See application file for complete search history.

(56) References Cited

U.S. PATENT DOCUMENTS 6,076,032 A  6/2000  Kuroda et al.
6,161,071 A  12/2000  Shuman et al.
(Continued)

FOREIGN PATENT DOCUMENTS

JP     6070307     4/1985
JP     2001123860  5/2001
JP     2013124031  6/2013

OTHER PUBLICATIONS

McDonough, et al., "Modeling of Vehicle Driving Conditions Using Transition Probability Models", 2011 IEEE International Conference on Control Applications (CCA), Denver, CO, Sep. 28-30, 2011, 6 pages.

(Continued)

*Primary Examiner* — Michael J Zanelli
(74) *Attorney, Agent, or Firm* — Frank MacKenzie; Bejin Bieneman PLC (57) ABSTRACT

A rule-based vehicle cruise-control system includes a computer in a vehicle, the computer including a processor and a memory, and the computer is configured to control a vehicle speed within a first speed threshold according to a set point inputted to the cruise control system. The computer is configured to determine a current grade value is within a first grade threshold and adjust the set point to control the vehicle speed within a second speed threshold outside the first speed threshold. The computer is further configured to determine the current grade value is within a second grade threshold and adjust the set point to recover the vehicle speed to within the first speed threshold.

20 Claims, 3 Drawing Sheets

(51) Int. Cl.
  *B60W 10/10* (2012.01)
  *B60W 10/18* (2012.01)
  *B60W 30/14* (2006.01)

(52) U.S. Cl.
  CPC ..... *B60W 30/143* (2013.01); *B60W 2510/0638* (2013.01); *B60W 2510/0647* (2013.01); *B60W 2510/1005* (2013.01); *B60W 2520/10* (2013.01); *B60W 2550/142* (2013.01); *B60W 2710/0644* (2013.01); *B60W 2710/1005* (2013.01); *B60W 2720/10* (2013.01)

(56) References Cited

U.S. PATENT DOCUMENTS

| | | | | |
|---|---|---|---|---|
| 6,374,173 | B1* | 4/2002 | Ehlbeck | B60K 31/047 180/170 |
| 2006/0293841 | A1 | 12/2006 | Hrovat et al. | |
| 2010/0004848 | A1* | 1/2010 | Transou, Jr. | B60W 30/143 701/110 |
| 2010/0114424 | A1 | 5/2010 | Morris et al. | |
| 2011/0087398 | A1 | 4/2011 | Lu et al. | |
| 2011/0166757 | A1 | 7/2011 | Otanez et al. | |
| 2011/0190972 | A1 | 8/2011 | Timmons et al. | |
| 2011/0251748 | A1 | 10/2011 | Moran et al. | |
| 2011/0276216 | A1* | 11/2011 | Vaughan | B60W 10/06 701/31.4 |
| 2013/0226420 | A1* | 8/2013 | Pedlar | B60K 31/047 701/67 |
| 2014/0121902 | A1 | 5/2014 | Moran et al. | |
| 2014/0200788 | A1* | 7/2014 | Eriksson | B60K 31/0058 701/93 |
| 2014/0236448 | A1* | 8/2014 | Eriksson | B60K 31/06 701/93 |
| 2014/0244130 | A1 | 8/2014 | Filev et al. | |
| 2014/0336890 | A1 | 11/2014 | Kresse et al. | |
| 2015/0329113 | A1* | 11/2015 | Carlsson | B60W 30/143 701/93 |

OTHER PUBLICATIONS

U.S. Appl. No. 14/252,193, filed Apr. 14, 2014; Non-Final Office Action dated Apr. 24, 2015, 18 pages.

Massel et al., "Investigation of different techniques for determining the road uphill gradient and the pitch angle of vehicles", Proceeding of the 2004 American Control Conference, Boston, MA, Jun. 30-Jul. 2, 2004; ThM05.3 (6 pages).

Final Office Action dated Oct. 29, 2015; U.S. Appl. No. 14/252,193; 23 pages.

* cited by examiner

RULE-BASED CRUISE CONTROL SYSTEM AND METHOD

CROSS-REFERENCE TO RELATED APPLICATIONS

This application claims priority to U.S. Provisional Patent Appl. No. 61/915,365, filed Dec. 12, 2013 entitled "Rule Based Smart Cruise Control", the complete contents of which is hereby incorporated herein by reference in its entirety. This application also claims priority to U.S. Provisional Patent Appl. No. 61/987,241, filed May 1, 2014 entitled "Systems and Methodologies for Smart Cruise Control", the complete contents of which is also hereby incorporated herein by reference in its entirety.

BACKGROUND

Energy efficiency is a design priority for many current mass market passenger vehicles. Energy efficiency can be addressed in many ways including, e.g., by minimizing the consumption of fuel and/or electrical energy, dependent on the vehicle powertrain configuration, for certain vehicle operations. However, packaging and other design considerations may limit the availability to add components to a vehicle. Furthermore, typical mass-market passenger vehicles have one or more at least partially automatically or computer-controlled operational states, e.g., cruise control. It is desirable, but currently difficult, to optimize energy consumption in an at least partially automatically or computer-controlled operational state of a vehicle, such as cruise control, utilizing existing control systems.

DETAILED DESCRIPTION

A cruise-control system according to the principles of the present disclosure may utilize an adaptive cruise controller for a passenger vehicle to execute deviations from the driver-inputted cruise set point with the goal of minimizing fuel consumption over a given interval, according to, e.g., vehicle speed, road grade, and the driver-inputted cruise set point. Such a cruise control system may include instantaneous (sensed or measured) and future (modeled or predicted) grade information, and passenger comfort through a set of criteria, which establishes a rule base for when glide, hold and recover (acceleration) states are initiated and terminated. Furthermore, during the glide state, the system may shift into neutral and/or fuel shutoff to maximize fuel economy gains during the deceleration phase. Accordingly, this system may achieve enhanced fuel economy performance goals during cruise control operations using existing vehicle sensing and actuation.

For example, a cruise control system, method and/or a non-transitory computer-readable medium tangibly embodying computer-executable instructions may control a vehicle speed within a first speed threshold according to a set point inputted to a cruise control system, by either a driver of the vehicle or a sensor, such as a forward-looking radar, and determine whether a current grade value is within a first grade threshold. The set point may be adjusted to control the vehicle speed within a second speed threshold outside the first speed threshold. The current grade value may be determined to be within a second grade threshold; and the set point may be adjusted to recover the vehicle speed to within the first speed threshold. In some implementations, the control by the system, method and/or instructions of the vehicle speed within the second speed threshold includes operating a glide state of the cruise control system as long as the vehicle speed is within a third speed threshold, determining the current grade value is outside the second grade threshold, and maintaining the vehicle speed outside the first speed threshold. Furthermore, operating a glide state of the cruise control system may include shifting a vehicle transmission to neutral and/or initializing a deceleration fuel shutoff.

To achieve enhanced fuel economy performance, the first and second speed thresholds and the first and second grade thresholds may be determined according to a fuel efficiency performance value, goal or design target. To utilize a baseline cruise controller in implementation of the system, method and/or instructions, a torque change signal may be inverted and communicated to the baseline cruise controller to adjust the set point. The system, method and/or instructions may further incorporate a predicted grade values and associated probabilistic grade thresholds.

Figure 1:
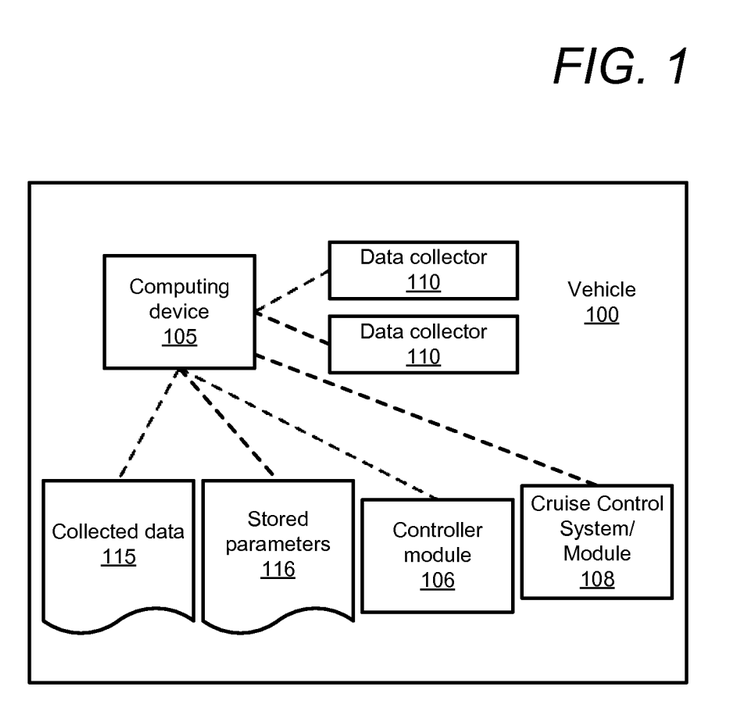
FIG. 1 illustrates an exemplary vehicle system according to the principles of the present disclosure.

FIG. 1 schematically illustrates an exemplary vehicle 100. The exemplary system may take many different forms and include multiple and/or alternate components and facilities. It is to be understood that the exemplary components illustrated are not intended to be limiting, and that additional or alternative components and/or implementations may be used. For example, the vehicle 100 may be any passenger or commercial vehicle such as a car, a truck, sport-utility vehicle, a bus, train, a boat, or an airplane.

With further reference to FIG. 1, an exemplary vehicle 100 includes a vehicle computing device or computer 105 that generally includes a processor and a memory, the memory including one or more forms of computer-readable media, and storing instructions executable by the processor for performing various operations, including as disclosed herein. The computer 105 of the vehicle 100 receives information, e.g., collected data, from one or more data collectors 110 related to various components or conditions of the vehicle 100, e.g., components such as an accelerometer sensor system, a torque sensor system, a braking system, a steering system, a powertrain, etc., and/or conditions such as vehicle 100 torque demand, speed, acceleration, pitch, yaw, roll, etc. The computer 105 may include more than one computing device, e.g., controllers or the like included in the vehicle 100 for monitoring and/or controlling various vehicle components, e.g., a controller module 106, a cruise-control system or module 108, an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Generally included in instructions stored in and executed by the computer 105 is a controller module 106. Using data received in the computer 105, e.g., from data collectors 110, data included as stored parameters 116, etc., the module 106 may control various vehicle 100 systems or equipment. For example, the module 106 may be used to accelerate, decelerate or maintain the velocity of vehicle 100, such as in conjunction with a torque demand from the cruise-control system 108 of the vehicle 100.

Data collectors 110 may include a variety of devices. For example, various controllers in a vehicle may operate as data collectors 110 to provide data 115 via the CAN bus, e.g., data 115 relating to torque demand and/or output, vehicle speed, acceleration, road grade, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include communication devices to send and receive information from other vehicles, such as path intentions from vehicles surrounding vehicle 100. Sensor data collectors 110 could include mechanisms such as RADAR, LADAR, sonar, etc. sensors that could be deployed to measure a distance between the vehicle 100 and other vehicles or objects and/or their speeds. Yet other sensor data collectors 110 could include accelerometer sensors. In addition, data collectors 110 may include sensors to detect a position, change in position, rate of change in position, etc., of vehicle 100 components such as a steering wheel, brake pedal, accelerator, gearshift lever, etc.

A memory of the computer 105 generally stores collected data 115. Collected data 115 may include a variety of data collected in a vehicle 100. Examples of collected data 115 are provided above, and moreover, data 115 is generally collected using one or more data collectors 110, and may additionally include data calculated therefrom in the computer 105. In general, collected data 115 may include any data that may be gathered by a collection device 110 and/or computed from such data. Accordingly, collected data 115 could include a variety of data related to vehicle 100 operations and/or performance, data received from another vehicle, as well as data related to environmental conditions, road conditions, etc. relating to the vehicle 100. For example, collected data 115 could include data concerning a vehicle 100 torque demand, measured or sensed torque, position, speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 100. These parameters may vary due to an environmental condition, road condition, vehicle 100 condition, an operating mode or state of a system of the vehicle 100, or the like. For example, a parameter 116 may specify, for one or more operational states of the cruise-control system 108 and conditions of the vehicle 100, speed and road grade thresholds. Such parameters 116 may also be mapped or updated by the computer 105.

Figure 2:
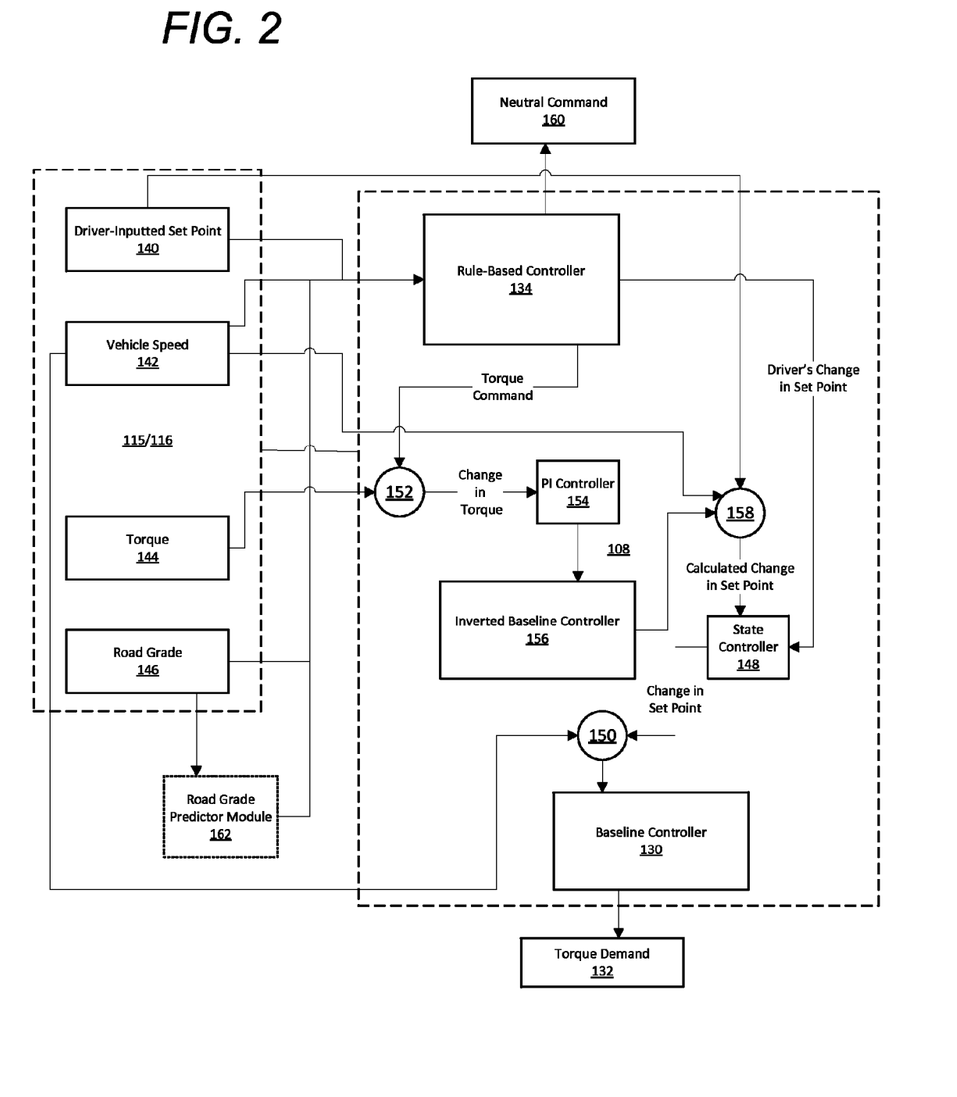
FIG. 2 is a schematic chart of an exemplary cruise-control system according to the principles of the present disclosure.

With reference to FIG. 2, an exemplary cruise-control system 108 according to the principles of the present disclosure includes a baseline controller 130 which communicates a torque demand, schematically illustrated at a block 132, to, e.g., the computer 105 and/or the controller 106 of the vehicle 100. The cruise-control system 108 further includes a rule-based controller 134, which determines torque required to provide particularly desired performance, e.g., operating according to certain data 115 and/or parameters 116 for optimizing fuel economy. In one implementation, the rule-based controller 134 may utilize, from the collected data 115, the following data respectively illustrated with blocks 140, 142, 144, 146: driver-inputted cruise set point, vehicle speed, road grade and torque data.

It should be understood that the baseline controller 130 may be in the form of a typical cruise controller for current mass market passenger vehicles, that adjusts torque demand based on the vehicle speed and the driver's input. While incorporating the baseline controller 130, the cruise-control system 108 according to the principles of the present disclosure may provide a plurality of operating states, including a normal state in which a state controller 148 couples the rule-based controller 134 to the baseline controller 130, and the rule-based controller 134 communicates any change in the driver-inputted cruise set point 140 to a block 150. At the block 150, any deviation between the driver-inputted cruise set point 140 and the vehicle speed 142 may be determined, and the baseline controller 130 may adjust torque demand 132 accordingly.

According to the principles of the present disclosure, in other operating states for the cruise-control system 108, e.g., glide, hold, and recover states, the state controller 148 couples signal processing or controller components between the rule-based controller 134 to the baseline controller 130, and the rule-based controller 134 communicates a torque command signal to such components and, ultimately, to the baseline controller 130. In one implementation, at a block 152, a torque change for the vehicle 100 is determined based on a torque command from the rule based controller 134 and the torque data 144.

The torque change determined at the block 152 may be processed into a torque command through a proportional-integral (PI) controller 154. In turn, the torque command may be further processed into a set point change signal through an inverted baseline controller 156. According to the principles of the present disclosure, the inverted baseline controller 156 translates the torque command signal from the PI controller 154 to a calculated set point for the baseline controller 130, based on the operating parameters of the baseline controller 130, to enable execution of the torque command determined by the rule-based controller 134 by the baseline controller 130 in the same manner of executing a change in set point by a driver of vehicle 100. In particular, at a block 158, a calculated change in the set point may be determined from the calculated set point and the vehicle speed 142. The state controller 148 provides the calculated change in the set point to the block 150 in the same manner that a driver-inputted change in the set point is delivered during the normal state of the cruise-control system 108. As such, the cruise-control system 108 may utilize the baseline controller 130 to execute deviations from the driver-inputted set point determined by the rule-based controller 134, those deviations based on, e.g., vehicle speed, road grade, and the driver-inputted set point to provide particular performance goals, e.g., minimizing fuel consumption over a given interval.

In some implementations, the rule-based controller 134 may be coupled to the controller 106 of the vehicle 100 in order to provide a neutral command—so that the vehicle 100 shifts to neutral, schematically represented at a block 160. For example, in the glide state, the rule-based controller 134 may determine that the vehicle 100 may most efficiently travel for the upcoming interval with the transmission in neutral, an operation outside of the capability of a typical baseline cruise-control module. Upon a determination of the cruise-control system 108 that the glide state should transition to the hold or recover state, the torque command from the rule-based controller 134 would result in re-engagement of a gear of the vehicle 100.

It should be understood that the blocks 150, 152 and 158 may represent independent hardware of the cruise-control system 108 or may be included in one of the other components of the cruise control system 108 or the vehicle 100, e.g., the baseline controller 130, the rule-based controller 134, the state controller 148 and the inverted baseline controller 156.

In some implementations, the cruise-control system 108, or the computer 105 or the controller 106, may include a road grade predictor module 162. Exemplary grade prediction techniques that may be employed by the road grade predictor module 162 to determine probabilistic grade information over a horizon of the vehicle 100 include one or more of Markov modeling and model predictive methods, that is, dynamic models that are updated recursively (RLS). Probabilistic grade information and thresholds for this information for, e.g., the normal, glide, hold and recover states of the cruise-control system 108 may be stored among parameters 116. In implementations without that grade prediction information, or where it is otherwise unavailable, the incorporation of this information may be disabled, e.g., by fixing all of the probabilities to a certain value (such as 1 or 100%).

The cruise-control system 108 may also utilize a forward looking radar signal amongst stored data 115, to modify the driver-inputted set point 140 (or goal speed). That is, the vehicle 100 may sense another vehicle ahead, and adjust the goal speed so as to maintain a safe follow distance.

To optimize cruise-control system 108 for, e.g., fuel economy, the computer 105, the controller 106 and/or the cruise-control system 108 may determine thresholds for the vehicle speed, road grade and/or predicted road grade, for each of the operating states of the cruise-control system 108, using one or more of genetic algorithms, sensitivity models (online updating), dynamic programming, stochastic dynamic programming, user experiences, a Markov decision processes, etc. In some implementations, the various optimization techniques can be performed on simulated data, and validated in vehicle. The thresholds for the vehicle speed, road grade and/or predicted road grade for each of the normal, glide, hold and recover states may be stored among parameters 116, and may be dynamic or updated according to conditions of vehicle 100, including vehicle speed, precipitation, ambient light, etc.

In general, computing systems and/or devices, such as the computer 105, the controller module 106, and/or components of the cruise-control system 108 of the vehicle 100, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a vehicle computer or control unit, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
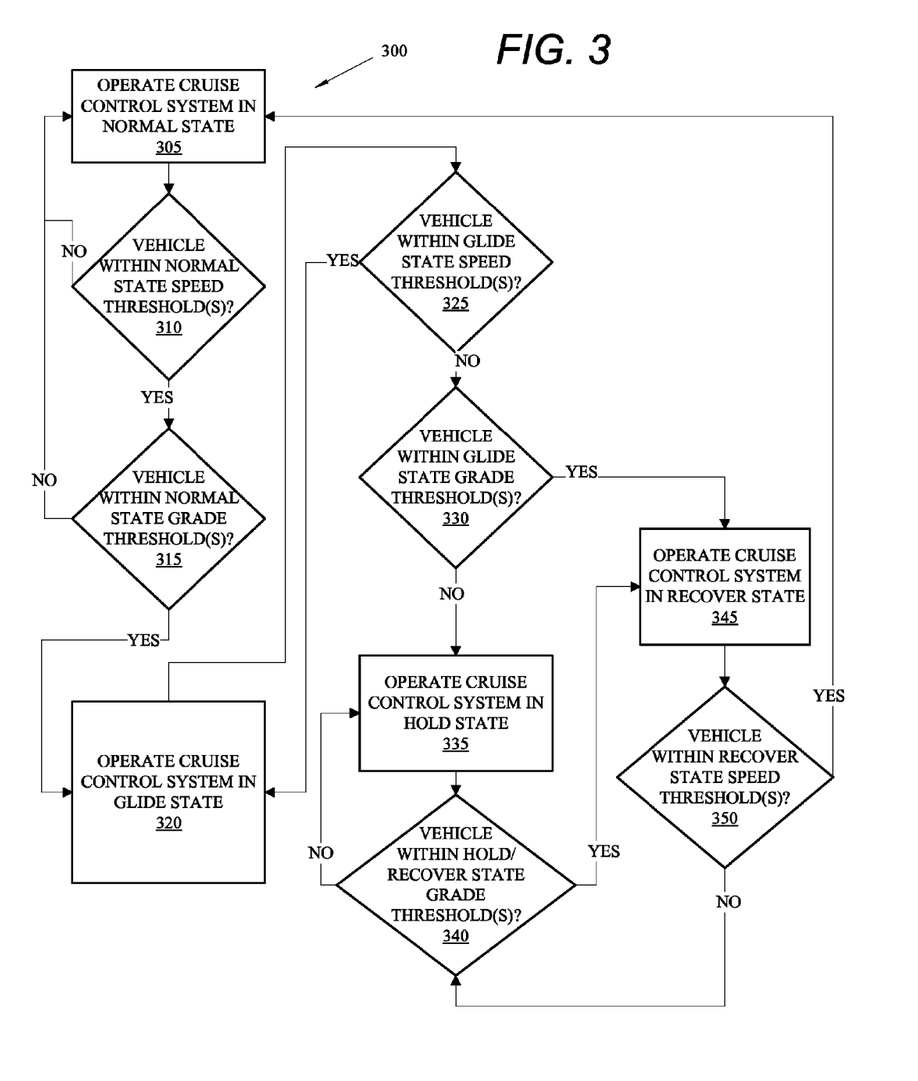
FIG. 3 is a flowchart of one exemplary process that may be implemented by an exemplary cruise-control system according to the principles of the present disclosure.

FIG. 3 is a flowchart of an exemplary process 300 that may be implemented by the computer 105, controller module 106, and the cruise-control system 108 of the vehicle 100 to utilize the cruise-control system 108.

The process starts at a block 305, where a driver activates the cruise-control system 108 and inputs an initial set point. Referring to a block 310, the cruise-control system 108 operates in the normal state to establish the speed of the vehicle 100 at the initial set point or within normal state speed thresholds stored among parameters 116 relative to the driver-inputted set point. When the vehicle 100 reaches a sufficient speed per the driver-inputted set point and the normal state speed thresholds, the process 300 continues to a block 315, where the process determines if the path of the vehicle is within normal state grade thresholds stored among parameters 116. For example, where vehicle 100 includes a road grade predictor module 162, the normal state grade thresholds may include both a threshold for the current measured grade and a probabilistic threshold for the chance that the predicted grade in the upcoming path is likely to also be within the grade threshold. If not, the process 300 returns to the block 305, and the vehicle 100 operates in the normal state of the cruise-control system 108, until both the speed is sufficient and the grade of the path is sufficient.

If the applicable normal state grade thresholds are satisfied at the block 315, the process 300 continues to a block 320, where the cruise-control system 108 operates the vehicle 100 in the glide state. Referring to a block 325, as long as the vehicle 100 stays within glide state speed thresholds stored among parameters 116, the cruise-control system 108 remains in the glide state. In some implementations, the glide state speed thresholds will be generally be of a greater magnitude than the normal state speed thresholds. For example, in the glide state, such as when the vehicle 100 is traveling downhill, no torque from the engine may be needed to maintain the vehicle 100 within the glide state speed thresholds. Moreover, the thresholds may be set to be greater than those of the baseline controller 130 would typically apply. The relatively higher tolerance for speed deviation allows the vehicle 100 to maximize the fuel economy benefits of the glide state. In some implementations, as noted above, the rule-based controller 134 may communicate directly with the controller 106 of the vehicle 100 to shift the vehicle 100 into neutral during the glide state.

Referring to a block 330, if the vehicle 100 in the glide state attains a speed outside of the glide state speed thresholds, the process 300 determines if the path of the vehicle 100 is within glide state grade thresholds stored among parameters 116. For example, where vehicle 100 includes a road grade predictor module 162, the glide state grade thresholds may include both a threshold for the current measured grade and a probabilistic threshold for the chance that the predicted grade in the upcoming path is likely to also be within the grade threshold.

Referring to a block 335, where the path of the vehicle 100 is outside of the glide state grade thresholds, e.g., the vehicle 100 is going up a sufficiently steep hill according to the glide state grade thresholds, the cruise-control system 108 operates the vehicle 100 in the hold state. To have entered the hold state, the vehicle 100 is outside of the glide state speed thresholds and, thus, in some implementations, outside of the normal state speed thresholds. Instead of accelerating the vehicle 100 toward a speed closer to the driver-inputted set point, the cruise control system 108 maintains the speed of the vehicle 100 until the path may accommodate an efficient acceleration. That is, referring to a block 340, when the cruise-control system 108 is in the hold state, it remains in the hold state until the process 300 determines that path of the vehicle 100 is within the hold state grade thresholds.

When the vehicle 100 detects that the upcoming path is within the hold state grade thresholds, the process 300 continues to a block 345, and the cruise-control system 108 operates the vehicle in the recover state. The process 300 next determines, at a block 350, if the vehicle 100 is within recover state speed thresholds—i.e., the vehicle 100 is "back up to speed" relative to the driver-inputted set point. If so, the process 300 returns to the block 305, and the cruise-control system 108 returns to the normal state of operation. If the vehicle 100 is not within the recover state speed thresholds at the block 350, the process 300 returns to the block 340. If the path of the vehicle is determined to be within recover state grade thresholds, the cruise-control system 108 continues to operate vehicle in the recover state. If not, the process 300 returns to the block 335 and the cruise-control system 108 again operates the vehicle 100 in the hold state as described herein.

The recover state of the cruise control system 108 is the only state that requires more torque than normal state/baseline controller 130. Therefore, the more efficient the recover state operates, the more efficient the cruise control system 108. The most efficient torque to recovery speed is dependent on the road grade, and the relationship may be experimentally mapped and/or modeled. In one implementation, an experimental map of this relationship stored onboard the vehicle 100, e.g., among the parameters 116, and may be updated in real-time by, e.g., the computer 105. Using such a map, the optimal recovery torque may be selected based on the detected/measured road grade during the recover state of operation of the cruise-control system 108.

In another implementation, recovery torque may be selected according to a model predictive controller while the cruise-control system 108 operates in the recover state. Such a model predictive controller may use a vehicle model, e.g., an adaptive model, to determine the optimal torque trajectory for best fuel economy. Where such a model predictive controller determines the minimum fuel torque trajectory subject to constraints on minimum distance to a vehicle ahead, deviation from a driver-inputted set point, and maximum torque to prevent torque converter unlock (if vehicle 100 is so equipped).

In implementations in which the vehicle 100 includes a road grade predictor module 162, the cruise-control system 108 according to the principles of the present disclosure maintains a normal state of operation if: (1) an instant road grade is greater than a maximum grade for transition from the normal state, (2) the difference between the vehicle speed and a driver-inputted set point is greater than an acceptable deviation threshold, or (3) the probability that the mean grade over the horizon is less than or equal to the maximum forecasted average grade for transition from the normal state is less than the normal state probability threshold for the maximum forecasted average grade, as determined by the road grade predictor module 162. The cruise-control system 108 transitions from the normal state to a glide state: (1) the instant road grade is less than or equal to the maximum grade for transition from normal state, (2) the difference between the vehicle speed and the set point is less than or equal to an acceptable deviation threshold, and (3) the probability that the mean grade over the horizon is less than or equal to the maximum forecasted average grade for transition from normal state is greater than or equal to the normal state probability threshold for maximum forecasted average grade.

The cruise-control system 108, once in the glide state of operation, may maintain the glide state, or transition to the hold or recover state. The cruise-control system 108 maintains the glide state if the difference between the vehicle speed and the driver-inputted set point is less than the maximum deviation threshold. According to the principles of the present disclosure, maximizing time in the glide state for a given glide state speed deviation threshold also maximizes fuel economy. Therefore, in some instances, during the glide state, the transmission can be shifted to neutral, and/or DFSO (deceleration fuel shutoff) may be initiated if the vehicle is so equipped. Shifting into neutral minimizes drag due to the powertrain, prolonging the glide state, while DFSO minimizes fuel consumption during this phase, as long as the interval provides sufficient time to make up for fuel expended upon DFSO restart.

The cruise-control system 108 transitions from glide to hold if: (1) an instant road grade is greater than the maximum grade for transition from the glide state, and (2) the difference between the vehicle speed and the driver-inputted set point is greater than or equal to a maximum deviation threshold. The cruise-control system 108 also transitions from glide to hold if: (1) the difference between the vehicle speed and the driver-inputted set point is greater than or equal to a maximum deviation threshold, and (2) the probability that the mean grade over the horizon is less than or equal to a maximum forecasted average grade for transition from glide state is less than the glide state probability threshold for a maximum forecasted average grade.

The cruise-control system 108 transitions from the glide state to the recover state if: (1) an instant road grade is less than or equal to a maximum glide grade, (2) the difference between a vehicle speed and the driver-inputted set point is greater than or equal to a maximum deviation threshold, and (3) the probability that the mean grade over the horizon is less than or equal to the maximum forecasted average glide grade is greater than or equal to the glide state probability threshold for a maximum forecasted average grade.

When in the hold state of operation, the cruise-control system 108 may transition to the recover state or be maintained. The cruise-control system 108 transitions from the hold to the recover state if: (1) an instant road grade is less than a maximum grade for transition from the hold state, and (2) the probability that the mean grade over the horizon is less than or equal to the maximum forecasted average grade for transition from the hold state is greater than or equal to the hold state probability threshold for maximum forecasted average grade.

The cruise-control system 108 maintains the hold state if: (1) an instant road grade is greater than or equal to a maximum grade for transition from the hold state, or (2) the probability that the mean grade over the horizon is less than or equal to a maximum forecasted average grade for transition from the hold state is less than the hold state probability threshold for a maximum forecasted average grade.

When in the recover state of operation, the cruise-control system 108 may maintain the recover state or may transition to the normal or hold state. The cruise-control system 108 maintains the recover state if: (1) the difference between a vehicle speed and the driver-inputted set point is greater than or equal to an acceptable deviation threshold, (2) an instant road grade is less than a maximum grade for transition from the recover state, and (3) the probability that the mean grade over the horizon is less than or equal to a maximum forecasted average grade for transition from the recover state is greater than or equal to the recover state probability threshold for a maximum forecasted average grade. The cruise-control system 108 transitions from the recover state to the hold state if: (1) the difference between the vehicle speed and the set point is greater than or equal to the acceptable deviation threshold, (2) the instant road grade is greater than or equal to the maximum grade for transition from recovery state, and (3) the probability that the mean grade over the horizon is less than or equal to a maximum forecasted average grade for transition from the recover state is less than the recover state probability threshold for a maximum forecasted average grade.

The cruise control system 108 transitions from the recover state to the normal state if the difference between the vehicle speed and the set point is less than the acceptable deviation threshold, i.e., the vehicle 100 is "back up to speed."

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising a computer in a vehicle, the computer comprising a processor and a memory, wherein the computer is configured to:
   control a vehicle speed within a first speed threshold according to a set point inputted to a cruise control system;
   determine a current grade value is within a first grade threshold;
   adjust the set point to control the vehicle speed within a second speed threshold outside the first speed threshold;
   determine the current grade value is within a second grade threshold; and
   adjust the set point to recover the vehicle speed to within the first speed threshold.

2. The system of claim 1, wherein adjusting the set point to control the vehicle speed within the second speed threshold includes:
   operating a glide state of the cruise control system as long as the vehicle speed is within a third speed threshold, including one of selectively shifting a vehicle transmission to neutral and selectively initializing a deceleration fuel shutoff;

determining the current grade value is outside the second grade threshold; and maintaining the vehicle speed outside the first speed threshold.

3. The system of claim 1, wherein the computer is further configured to: modify the set point according to a forward vehicle detection signal.

4. The system of claim 1, wherein the computer is further configured to: determine at least the first and second speed thresholds and the first and second grade thresholds according to a fuel efficiency performance value.

5. The system of claim 1, wherein the computer is further configured to: invert a torque change signal to adjust the set point.

6. The system of claim 1, wherein the first grade threshold is a first probabilistic grade threshold.

7. The system of claim 1, wherein the computer is further configured to:

determine a recovery torque according to the current road grade and a fuel efficiency performance value; and adjust the set point to recover the vehicle speed to within the first speed threshold according to the recovery torque.

8. A method comprising:

controlling a vehicle speed within a first speed threshold according to a set point inputted to a cruise control system by one of a driver and a forward vehicle sensor;

determining a current grade value is within a first grade threshold;

adjusting the set point to control the vehicle speed within a second speed threshold outside the first speed threshold;

determining the current grade value is within a second grade threshold; and adjusting the set point to recover the vehicle speed to within the first speed threshold.

9. The method of claim 8, wherein adjusting the set point to control the vehicle speed within the second speed threshold includes:

operating a glide state of the cruise control system as long as the vehicle speed is within a third speed threshold;

determining the current grade value is outside the second grade threshold; and maintaining the vehicle speed outside the first speed threshold.

10. The method of claim 9, wherein operating a glide state of the cruise control system includes one of shifting a vehicle transmission to neutral and deceleration fuel shutoff.

11. The method of claim 8, further comprising: determining at least the first and second speed thresholds and the first and second grade thresholds according to a fuel efficiency performance value.

12. The method of claim 8, further comprising: inverting a torque change signal to adjust the set point.

13. The method of claim 8, wherein the first grade threshold is a first probabilistic grade threshold.

14. The method of claim 8, further comprising:

determining a recovery torque according to the current road grade and a fuel efficiency performance value; and adjusting the set point to recover the vehicle speed to within the first speed threshold according to the recovery torque.

15. A non-transitory computer-readable medium tangibly embodying computer-executable instructions that cause a processor to execute operations comprising:

controlling a vehicle speed within a first speed threshold according to a set point inputted to a cruise control system;

determining a current grade value is within a first grade threshold;

operating a glide state of the cruise control system as long as the vehicle speed is within a second speed threshold;

determining the current grade value is outside a second grade threshold; and maintaining the vehicle speed outside the first speed threshold;

adjusting the set point to control the vehicle speed within a third speed threshold outside the first speed threshold;

determining the current grade value is within the second grade threshold; and adjusting the set point to recover the vehicle speed to within the first speed threshold.

16. The non-transitory computer-readable medium of claim 15, embodying instructions causing the processor to execute operations further comprising: modifying the set point according to a forward vehicle detection signal.

17. The non-transitory computer-readable medium of claim 15 embodying instructions causing the processor to execute operations further comprising: determining at least the first and second speed thresholds and the first and second grade thresholds according to a fuel efficiency performance value, and wherein operating a glide state of the cruise control system includes one of selectively shifting a vehicle transmission to neutral and selectively initializing a deceleration fuel shutoff.

18. The non-transitory computer-readable medium of claim 15 embodying instructions causing the processor to execute operations further comprising: inverting a torque change signal to adjust the set point.

19. The non-transitory computer-readable medium of claim 15 wherein the first grade threshold is a first probabilistic grade threshold.

20. The non-transitory computer-readable medium of claim 15 embodying instructions causing the processor to execute operations further comprising:

determining a recovery torque according to the current road grade and a fuel efficiency performance value; and adjusting the set point to recover the vehicle speed to within the first speed threshold according to the recovery torque.

* * * * *